United States Patent [19]

Conibear et al.

[11] 4,107,868

[45] Aug. 22, 1978

[54] ACTUATOR

[75] Inventors: Frank Conibear; Peter Verstraaten, both of Victoria, Canada

[73] Assignee: Woodstream Corporation, Lititz, Pa.

[21] Appl. No.: 764,352

[22] Filed: Jan. 31, 1977

[30] Foreign Application Priority Data

Jul. 12, 1976 [CA] Canada .................................. 267353

[51] Int. Cl.² ............................................. A01M 23/26
[52] U.S. Cl. ............................................. 43/88; 43/90; 43/96
[58] Field of Search ................... 43/88, 90–97; 403/209, 213, 214; 24/73 HH, 73 TH, 201 HH

[56] References Cited

U.S. PATENT DOCUMENTS

| 401,244 | 4/1889 | Basel | 403/213 |
|---|---|---|---|
| 1,904,188 | 4/1933 | Zahn | 43/96 X |
| 3,971,155 | 7/1976 | Conibear | 43/90 |
| 4,037,350 | 7/1977 | Souza | 43/90 |

*Primary Examiner*—N. P. Godici
*Attorney, Agent, or Firm*—Holman & Stern

[57] ABSTRACT

An actuator for a rotating frame animal trap having two similar frames pivotally connected to each other. The actuator comprises two arms spring biased at one end and each terminating in a ring at the other. The rings have the dimensions so that the actuator can be mounted on the trap to encircle adjacent ends of both frames of the trap. On release of the trap, the actuator can rapidly and forcefully effect a rotation of the trap to its closed position. A rigid joint is formed in one arm of the actuator. The joint is breakable to separate the one arm by application of a force to the spring biased end of the actuator. The actuator does not affect the position of the set trap and is simple in construction.

4 Claims, 1 Drawing Figure

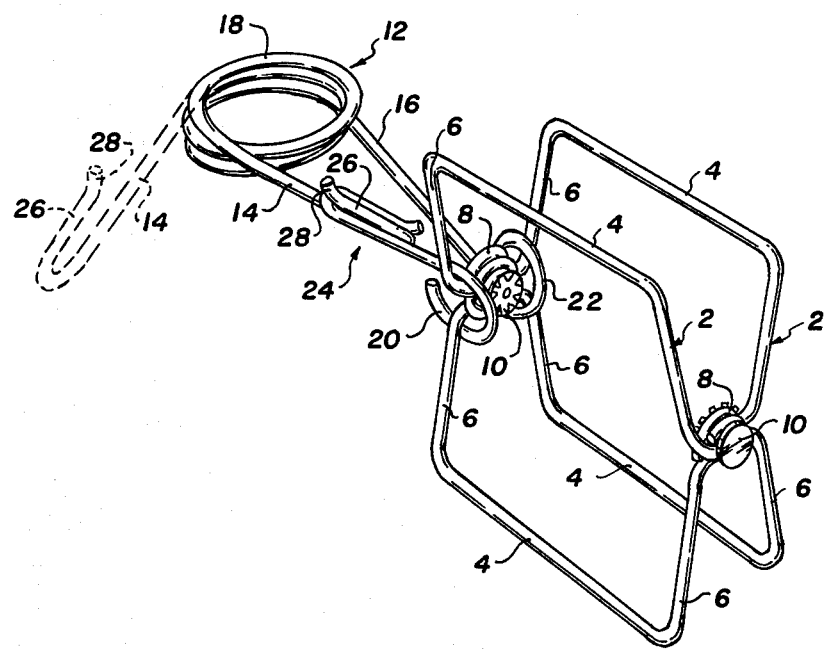

ACTUATOR

FIELD OF INVENTION

This invention relates to an actuator for a rotating frame animal trap.

DESCRIPTION OF PRIOR ART

Humane animal traps are being used increasingly in trapping. There is public outcry against the use of leg hold traps which operate by holding the animal until the animal dies of starvation or exposure. On the contrary humane traps, such as the rotating frame traps, are designed to kill the animal within a short time and, in the ideal, instantly.

The rotating frame animal trap has two similar frames, each having jaw-forming sides that lie in a common plane. There are ends extending between the jaw-forming sides to support the jaws. The ends each have a central portion in which the frames are pivotally connected through adjacent ends for rotation about a common axis between set and closed positions. The outer portions on each side of the central portion extend to the jaw. The traps are provided with trigger means for releasably maintaining the trap in the set position. Each trap has at least one actuator which is capable of rapidly and forcefully effecting the necessary rotation. The actuator has two arms spring-biased at one end so that the other end, which terminates in rings encircling adjacent ends of both frames on opposite sides of the common axis, would, if unobstructed move apart so a distance substantially greater than the length of the frame ends. The effect of the arrangement is that when the trigger is released the frames rotate rapidly about the common axis and the jaw-forming sides vigorously strike the body of the animal that has released the trap. In the ideal the jaw forming sides strike the animal with a vigorous blow at some vital part, for example the heart or the lungs, causing instant death.

All rotating frame animal traps, particularly the larger ones, are capable of exerting a powerful grip. There have been instances where trappers have had both hands caught in the trap and have died of exposure. One approach to this problem has been the incorporation of safety devices to prevent inadvertent movement of the trap from the set to the closed position. Another approach has been to ensure that the trap, when closed, can be released, usually by manipulation of the actuator. This last approach has been adopted, for example, in my Canadian Pat. No. 975170 issued Sept. 30, 1975 in which an actuator for a rotating frame trap has a ring at one end of the coil spring of the actuator provided with an opening through which the adjacent ends of the frame, about which the ring is normally disposed, can pass when the actuator is swivelled around the frame to a predetermined position. The effect of this is to remove the actuator bias from the jaws of the trap. A removable keeper is used to close the gap and prevent inadvertent removal of the frame ends through the gap.

SUMMARY OF INVENTION

The present invention seeks to provide a further simple solution of stopping the applied force of an actuator on a closed, rotating frame trap. In addition, in certain circumstances the actuator described and claimed in my above patent can prevent a trap in the open, set position resting properly on the ground. The actuator can not be swivelled to a position perpendicular to the axis of rotation of the trap because the keeper hits the frame before that position is reached. It is thus necessary with certain of the traps according to the above patent to sink the actuator in snow or earth to prevent the trap being too conspicuous. This sinking of the trap tends to prevent the actuator expanding properly.

Accordingly, in a first aspect, the present invention is in an actuator for a rotating frame trap, having two similar frames pivotally connected to each other, the actuator comprising two arms spring bias at one end and each terminating in a ring at the other, the rings having dimensions so that the actuator can be mounted on the trap to encircle adjacent ends of both frames of the trap, whereby, on release of the trap, the actuator can rapidly and forcefully effect a rotation of the trap to its closed position and is the improvement comprising a rigid joint formed in one arm of the actuator, said joint being breakable to separate the arm by application of a force to the spring biased end of the actuator.

In a preferred embodiment the rigid joint is made up of two mutually engageable U-sections in the arm. Preferably the actuator is made of round wire stock and each U-section has legs spaced from each other by an amount slightly smaller than the diameter of the round stock. This is a cheap but effective method of ensuring a rigid joint. Desirably the open ends of the U-sections are flared outwardly facilitating engagement of the separate parts of the arm.

BRIEF DESCRIPTION OF DRAWING

The invention is illustrated, merely by way of example, in the accompanying drawing.

DESCRIPTION OF PREFERRED EMBODIMENT

The drawing shows an animal trap having two similar frames 2 each having jaw forming sides 4 and ends 6 extending between the jaw forming sides 4 to support the jaws. The ends 6 have a central portion 8 in which the frames 2 are pivotly connected by rivots 10. The frames thus rotate about a common axis defined by the rivots 10. This rotation is between a set position as illustrated in the drawing and a closed position in which the jaw forming sides 4 are capable of trapping an animal between them. In this closed position the ends 6 have rotated through approximately 90 degrees from the position shown in the drawing.

The trap is provided with a trigger means to releasably maintain the trap in the set position. However, the trigger means do not form a part of this invention. Any conventional trigger means may be used and, in order to simplify the drawing, the trigger means are not shown.

The trap is provided with an actuator 12 that comprises a first arm 14 and the second arm 16. At one end of the arm 14 and 16 there is a coil spring 18. At the ends of the arms 14 and 16 remote from the coil 18 there are rings 20 and 22 respectively encircling adjacent ends 6 of the frames 2.

Arm 14 of the actuator 12 is formed with a rigid joint 24. The joint 24 is made up of U-sections 26-see particularly the dotted line showing U-section 26 after the rigid joint 24 has been broken. As indicated in the FIGURE each U-Section 26 has legs spaced apart from each other by an amount slightly smaller than the diameter of the round stock from which the actuator 12 is made. The U-Sections 26 are flared outwardly at the open end 28, which is a simple means of facilitating engagement of the two parts of the arm 14.

In use the invention functions as follows. If the trap is closed on the hands of the trapper then, clearly, he cannot use his hands to open the trap. However, by simply turning the trap on its side and striking the coil spring 18 on the ground, joint 24 can be broken and the force applied by the coil spring 18 thus not transmitted through the frames 2. The trapper can then simply remove his hands from the trap. simple resetting of the joint 24 is all that is required to make the trap useful again.

The actuator of the present invention may be made of the conventional steel used in rotating frame traps.

The actuator of the present invention is a simple and efficient saftey device for rotating frame animal traps. It is easy to make, effective as a means of removing the force applied by the coil spring 18 and yet can be easily made up, once the joint has been broken, to provide a useful trap.

We claim:

1. In an actuator for a rotating frame animal trap having two similar frames pivotaly connected to each other, the actuator comprising two arms spring biased at one end and each terminating in a ring at the other, the rings having the dimensions so that the actuator can be mounted on the trap to encircle adjacent ends of both frames of the trap, whereby on release of the trap, the actuator can rapidly and forcefully effect a rotation of the trap to its closed position, the improvement comprising a rigid joint formed in one arm of the actuator, said joint being breakable to separate the one arm by application of a force to the spring biased end of the actuator.

2. An actuator as claimed in claim 1 in which said arm is formed with two mutually engageable U-sections.

3. An actuator as claimed in claim 2 of round wire stock and in which each U-Section has legs spaced from each other by an amount slightly smaller than the diameter of the round stock.

4. An actuator as claimed in claim 3 in which the legs of the U-section are flared outwardly at their open ends to facilitate engagement of the two U-sections to complete said one arm.

* * * * *